(No Model.)

J. M. WELLS.
ELECTRIC BATTERY.

No. 533,936. Patented Feb. 12, 1895.

Witnesses
H. D. Kramm
Minnie Haley.

Inventor
James M. Wells
By W. V. Tifft
Atty.

UNITED STATES PATENT OFFICE.

JAMES M. WELLS, OF PEORIA, ILLINOIS.

ELECTRIC BATTERY.

SPECIFICATION forming part of Letters Patent No. 533,936, dated February 12, 1895.

Application filed July 31, 1893. Serial No. 481,926. (No model.)

*To all whom it may concern:*

Be it known that I, JAMES M. WELLS, a citizen of the United States, residing at Peoria, in the county of Peoria and State of Illinois, have invented certain new and useful Improvements in Electric Batteries; and I do hereby declare that the following is a full, clear, and exact description of the invention, which will enable others skilled in the art to which it appertains to make and use the same.

My invention involves certain improvements in the construction of what are commonly known as medical batteries for physicians, surgeons and general family use.

Generally this device consists of the portable case containing a galvanic battery, and an induction coil adapted for use with various kinds of electrodes for applying the induced currents to different parts of the human body.

My invention relates to this kind of apparatuses, and is directed to the improvement of the battery to produce a number of currents differing in intensity and the cheapening of batteries and the general construction of batteries to provide for economic use whereby the same is rendered more convenient, simple, cheap and capable of more general use and application.

I shall describe in detail the construction of the battery and then point out the distinguishing features of novelty which constitutes my present invention.

Figure 2:
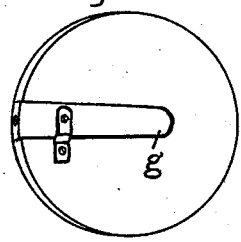
Figure 1:
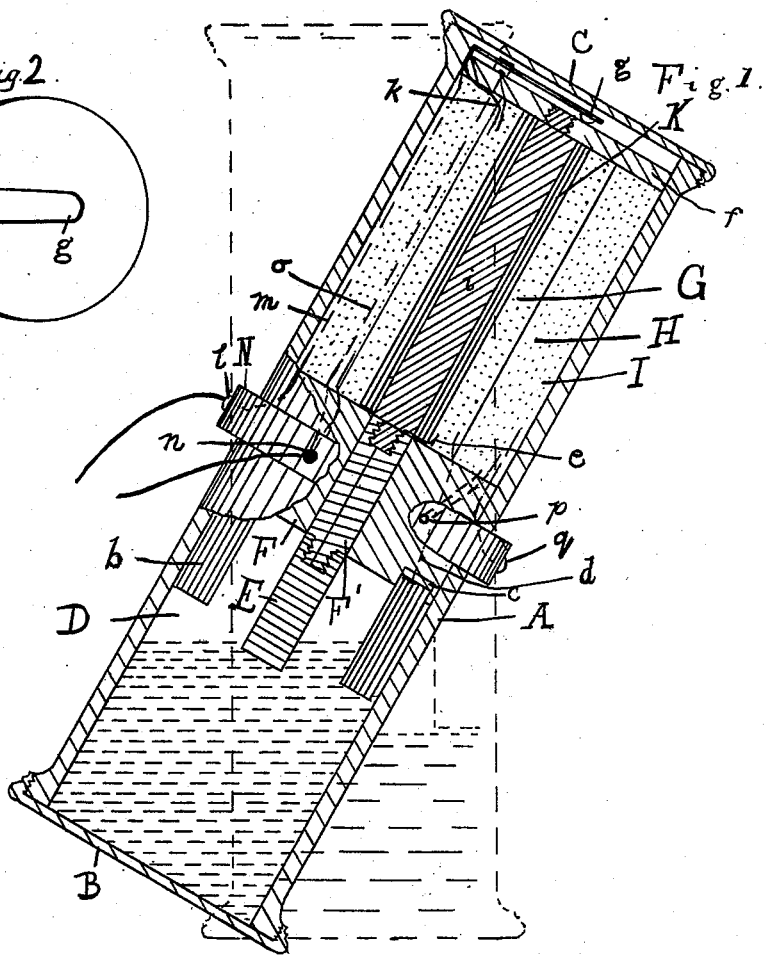
Figure 3:
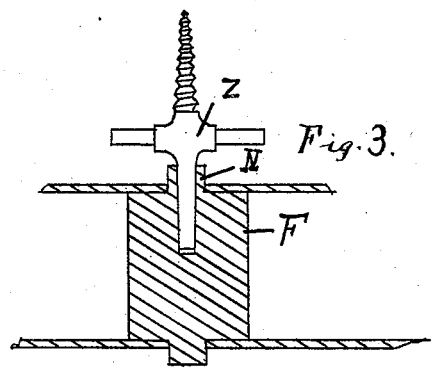

Referring to the drawings Figure 1 is a central longitudinal section of the main portion of the apparatus. Fig. 2 shows the attachment of the vibrating spring armature with an insulating head. Fig. 3 is a detailed view showing the manner of mounting the battery upon the pin or stud inserted in a perforation in the central body portion thereof that may be attached to the wall and to other suitable supports to facilitate in the adjustment of the battery.

The battery as a whole consists of two parts—the primary battery and induction coil inclosed in a case to which may be attached the electrodes.

The case A is preferably made in cylindrical form of hard rubber or light material. B and C are caps also of hard rubber.

D is a fluid cup or the part designed to contain the exciting solution, and primary battery parts, and all that portion above and within the case contains the induction coil, the vibrating armature for making and breaking the circuit. In this case the cup D is partially filled with the exciting solution, and a cylindrical carbon $b$ is secured in the cup being attached to the hard rubber partition F, which forms one head of the magnet by being carried within a depression necessarily ring shaped, and bearing upon the metal ring $c$, and secured therein upon the said metal ring in suitable manner by the use of cement filling for security of attachment and to prevent the exciting fluid from contacting with the said metal ring, and electrically connected by a wire $d$ with the primary coil G.

The zinc element E is supported upon the metal stud F by means of threaded parts bearing one upon the other and is connected with the primary coil G by the stud F and the wire $e$.

Above the space provided for battery fluid, zinc and carbon elements and the partition F, is the induction coil and core. This consists of the ordinary primary, secondary and second secondary coils G, H, I, on a core K, consisting of the straight rod $i$ wound with several layers of sheet metal for exposing broad surface of soft iron.

The coil is supported by an insulating head $f$ that is secured rigidly within the case by a screw connection with rod $i$. The head $f$ carries the vibrating spring armature $g$. The opposite or lower end of the coil is supported by the partition or insulating head F.

The circuit through the primary coil is completed by the wire $d$ connecting the carbon element with the said primary coil, and the primary coil at its outer termination $k$, connects with the vibrating spring armature and the contact point, and the vibrating spring armature is connected with the primary coil, and in its winding the terminal end thereof connects with the carbon element through the wire $d$, and the metal ring $c$ which completes the primary circuit. The vibrating armature is connected with the plug $l$ by means of the wire $m$, and the contact point is connected with the plug $n$ by means of the wire $o$, which connections enable me to obtain through the said plugs by proper electrode attachments the primary current. The secondary coil or the inner terminal end thereof connects with the plug $n$ and being wound around the core and upon the primary coil is connected at its outer terminal end with the plug $p$, which gives me the secondary current No. 1, and by connecting through suitable electrode attachment through the plug $l$, $n$, and $p$ the primary and secondary coils another and different current is obtained. The second secondary coil begins with the plug $p$, is wound around the secondary coil and the terminal end thereof connects with plug $q$.

The plugs $l$, $n$, $p$, and $q$, are hollowed out to form sockets to receive plugs carried by suitable electrodes.

It will be seen from the arrangement, construction, and connections that several currents differing in quality may be obtained by the proper connection with the different coils through the different plugs by means of suitable electrodes. The regulation of current is an essential feature of my invention or more particularly the means whereby it is regulated, and from the drawings it will be seen that the fluid cup is in the lower portion of the case, and it is purposed that the exciting solution shall fill the said cup when in a vertical adjustment up to a point just below the depending carbon and zinc elements and when in such vertical adjustment (which is its normal adjustment) no contact of the exciting solution and battery elements is had, and consequently no current is produced in the coil but in operation for the purpose of producing current or an electrical effect through the variously disposed coils it is purposed that the case shall be tipped in the manner indicated in the solid lines with the view of submerging the battery elements and when tipped, to slightly submerge the zinc and carbon, but a slight current is produced, but the more deeply they are submerged the greater the quantity of current until the maximum submerging is had when the case will occupy a vertical inverted position, thus obtaining graduation of current or the intensity thereof by this very simple, practical and effective means.

Commonly batteries are constructed, generally and in detail, very much the same so far as the primary elements are concerned, but numerous and varied appliances or parts have been devised for regulating the current, the different expedients adopted for this purpose, whether they be a metal cylinder or an adjustable core, the cylinder for slipping over the coils and the adjustable core for inserting and withdrawing for the purpose of regulation by overcoming induction, as they must all necessarily destroy a portion of the current, which necessarily is produced by the continued and complete submerging of the battery parts, and further that such batteries being wound to produce different coils to produce different effects, such effect will be detracted from by covering the coil with a metal shield or by any expedient adopted to overcome induction in any portion of the coil. I aim to produce in my battery in its winding certain electrical effects, which effects are not to be interfered with by any appliances for overcoming induction in any portion of my coil but the only change in the operation of the battery consists in the strength of current produced by the graduated submerging of the battery elements.

It will be seen from the drawings that a means is provided for tilting the battery, which consists merely of the stud Z and pin projection which bears within a perforation through the projecting rim N and into the body of the dividing partition F, which allows it to swing freely for the purpose designed. The other end of the stud may be screwed into the wall or may be attached to any convenient structure that will support the battery in proper position.

Having thus fully described my invention, what I claim, and desire to secure by Letters Patent, is—

1. A therapeutic battery consisting of an inclosing case or shell which is divided into two compartments by a partition of insulating material, one of said compartments being to contain a suitable battery fluid, a metallic pin extending through the insulating partition in the inclosing case and having one end projecting into the compartment containing the battery fluid, a positive battery element secured on such end of the metallic pin, a negative battery element carried by the insulating partition, and an induction coil arranged in the other compartment of the inclosing case and electrically connected with the negative battery element, the metallic pin carrying the positive element and suitable plugs, substantially as shown and described.

2. A therapeutic battery consisting of an inclosing case or shell interiorly divided into two compartments by a partition of insulating material, one of which compartments is adapted to contain a suitable battery fluid, a metallic pin extending through the insulating partition, one end of such pin being threaded and extending into the compartment containing the battery fluid and a socket being formed in the other end of the pin, a positive battery element secured on the threaded end of said pin, a negative battery element secured to the insulating partition, an induction coil arranged in the other compartment of the inclosing case and having one end of its core secured in the socket in the metallic pin in the insulating partition, and electrical connections between said coil, the negative battery element and plugs in the insulating partition, as shown and described.

3. In a therapeutic battery, the combination of an inclosing case having its interior divided into two compartments, one of which is adapted to contain a suitable battery fluid, by a partition of insulating material, a support pivotally connected to said shell, an induction coil arranged in one of the compartments of said shell and adapted to be connected with suitable electrodes, a metallic pin carried by the insulating partition and having one end in contact with the core of the induction coil and its other end projecting into the compartment containing the battery fluid, a positive battery element secured on the projecting end of such pin, a metallic plate secured to the insulating partition and electrically connected with the helix of the induction coil, and attached to said plate, substantially as shown and described.

4. In a therapeutic battery, the combination of an inclosing case or shell pivotally connected to a suitable support and having its interior divided into two compartments a partition of insulating material, an induction coil arranged in one of the compartments and adapted to be connected with suitable electrodes, a metallic pin extending through the insulating partition having one end connected with the core of the induction coil and its other end projecting into the other compartment, of the inclosing case or shell, which is adapted to contain a battery fluid, a positive battery element secured on said pin, a metallic ring arranged in a groove formed in the inclosing partition, around the helix of the induction coil in the other compartment, and a negative electrode attached to said ring, substantially as shown and described.

5. In a therapeutic battery, the combination of an inclosing case or shell having its interior divided into two compartments by a partition of insulating material, battery elements supported by said partition within one compartment of the case adapted to contain suitable battery fluid, an induction coil arranged in the other compartment of the case and having its core and primary helix separated by a metallic sleeve, electrical connections between the core and primary helix of the induction coil and the positive and negative battery elements, respectively, a vibrating spring armature, a series of hollow plugs secured in the partition between the compartments of the inclosing case and adapted to receive plugs carried by suitable electrodes, and electrical connections between such plugs, the helices of the induction coil and the armature substantially as shown and described, for the purpose specified.

In testimony whereof I affix my signature in presence of two witnesses.

JAMES M. WELLS.

Witnesses:
H. D. KRAMM,
MINNIE HALEY.